(12) United States Patent
Koller et al.

(10) Patent No.: US 8,463,239 B1
(45) Date of Patent: Jun. 11, 2013

(54) SECURE RECONFIGURATION OF WIRELESS COMMUNICATION DEVICES

(75) Inventors: Gary Duane Koller, Overland Park, KS (US); Mark Douglas Peden, Olathe, KS (US); Simon Youngs, Overland Park, KS (US); Raymond Emilio Reeves, Olathe, KS (US); Piyush Jethwa, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 132 days.

(21) Appl. No.: 13/025,247

(22) Filed: Feb. 11, 2011

(51) Int. Cl.
*H04M 1/66* (2006.01)
(52) U.S. Cl.
USPC ........... 455/411; 455/410; 455/418; 455/419; 455/420; 455/566
(58) Field of Classification Search
None
See application file for complete search history.

(56) References Cited

U.S. PATENT DOCUMENTS

| | | | |
|---|---|---|---|
| 6,203,069 B1 | 3/2001 | Outwater et al. | |
| 6,264,106 B1 | 7/2001 | Bridgelall | |
| 6,513,017 B1 | 1/2003 | Howard et al. | |
| 6,816,075 B2 | 11/2004 | Grunes et al. | |
| 6,947,571 B1 | 9/2005 | Rhoads et al. | |
| 6,961,555 B1 | 11/2005 | Philyaw | |
| 6,993,573 B2 | 1/2006 | Hunter | |
| 7,068,170 B2 | 6/2006 | Green | |
| 7,121,469 B2 | 10/2006 | Dorai et al. | |
| 7,181,066 B1 | 2/2007 | Wagman et al. | |
| 7,190,835 B2 | 3/2007 | Durbin et al. | |
| 7,222,791 B2 | 5/2007 | Heilper et al. | |
| 7,274,931 B2 | 9/2007 | Harris | |
| 7,523,866 B2 | 4/2009 | Longacre, Jr. et al. | |
| 7,634,065 B2 | 12/2009 | Fukunaga et al. | |
| 2001/0056359 A1 | 12/2001 | Abreu | |
| 2002/0052211 A1 | 5/2002 | Kim et al. | |
| 2002/0078363 A1 | 6/2002 | Hill et al. | |
| 2003/0156032 A1 | 8/2003 | Adams et al. | |
| 2003/0229678 A1 | 12/2003 | Wen et al. | |
| 2003/0233432 A1 | 12/2003 | Davis et al. | |
| 2004/0145613 A1 | 7/2004 | Stavely et al. | |
| 2004/0153553 A1 | 8/2004 | Chotkowski et al. | |
| 2005/0011957 A1 | 1/2005 | Attia et al. | |
| 2005/0026596 A1* | 2/2005 | Markovitz | 455/411 |
| 2005/0029354 A1 | 2/2005 | Frantz et al. | |

(Continued)

FOREIGN PATENT DOCUMENTS

| | | |
|---|---|---|
| EP | 0645728 | 3/1995 |
| JP | 2008090512 | 4/2008 |
| WO | WO-2006107610 | 10/2006 |

OTHER PUBLICATIONS

Jan Harris, "Accelerometers Could Enhance Camera Phone Pictures," Camera Core, Mar. 23, 2007, 3 pages, camera-core.co.uk, http://www.camera-core.co.uk/23-03-2007-accelerometers-could-enhance-camera-phonespictures.html.

(Continued)

*Primary Examiner* — Rafael Pérez-Gutiérrez
*Assistant Examiner* — Suhail Khan

(57) ABSTRACT

What is disclosed is a method of operating a communication system to reconfigure a wireless communication device. The method includes, in the wireless communication device, optically receiving image data. The method also includes processing the image data to display a configuration interface, and receiving an instruction into the configuration interface to reconfigure the wireless communication device.

20 Claims, 6 Drawing Sheets

U.S. PATENT DOCUMENTS

| | | | |
|---|---|---|---|
| 2005/0044179 A1 | 2/2005 | Hunter | |
| 2005/0080681 A1 | 4/2005 | Ohnishi | |
| 2005/0173524 A1 | 8/2005 | Schrader | |
| 2005/0215233 A1* | 9/2005 | Perera et al. | 455/411 |
| 2005/0282531 A1* | 12/2005 | Andreasson | 455/418 |
| 2006/0002591 A1 | 1/2006 | Hombo | |
| 2006/0020614 A1 | 1/2006 | Kolawa et al. | |
| 2006/0026048 A1 | 2/2006 | Kolawa et al. | |
| 2006/0042139 A1 | 3/2006 | Mendes | |
| 2006/0100925 A1 | 5/2006 | Finaly | |
| 2006/0212938 A1 | 9/2006 | Suzuki | |
| 2007/0061242 A1 | 3/2007 | Ramer et al. | |
| 2007/0061243 A1 | 3/2007 | Ramer et al. | |
| 2007/0061303 A1 | 3/2007 | Ramer et al. | |
| 2007/0083381 A1 | 4/2007 | Farrell et al. | |
| 2007/0101403 A1* | 5/2007 | Kubler | 726/3 |
| 2007/0133567 A1 | 6/2007 | West et al. | |
| 2007/0150588 A1 | 6/2007 | Ghadialy et al. | |
| 2007/0290045 A1 | 12/2007 | Cisar | |
| 2007/0290499 A1 | 12/2007 | Tame | |
| 2008/0116278 A1* | 5/2008 | Epshteyn | 235/462.25 |
| 2009/0061839 A1* | 3/2009 | Zimmerman et al. | 455/419 |
| 2009/0086045 A1 | 4/2009 | Giebel et al. | |
| 2010/0041968 A1 | 2/2010 | Meschisen et al. | |
| 2011/0130117 A1* | 6/2011 | Fan et al. | 455/411 |
| 2011/0305338 A1* | 12/2011 | Rogan | 380/270 |
| 2012/0090038 A1* | 4/2012 | Pacella et al. | 726/30 |

OTHER PUBLICATIONS

Jewels ET Jim, "Fashionable Medical I.D. Jewelry," May 8, 2008, 1 page, http://www.jewelsetjim.com/.

Livecycle, "Using Barcode Data in Processes," LiveCycle Workbench ES Help, Nov. 20, 2008, 3 pages, LiveCycle, ttp://livedocs.adobe.com/livecycle/es/wb_help/wwhelp/wwhimpl/common/html/wwhelp.htm?context=Workbench_ES&file=00001152.html.

PROJECTRESPONDER.COM, "Medical Alert Bracelet," May 8, 2008, 3 pages, http://www.projectrespondercom/medical-alert-bracelet~139.htm.

Pegasus Imaging Corporation, "Using Barcodes in Documents—Best Practices," Barcode Basics, 2007, pp. 1-9, Pegasus Imaging Corporation, http://www.pegasusimaging.com/BarcodesinDocuments-BestPractices.pdf.

Popular Electronics, "Apple Unlocked GSM Cell Phone," Nov. 21, 2008, 3 pages, Popular Electronics, http://www.popularelect.com/index.php?cPath=21_62.

Popular Electronics, "Nokia N82 Unlocked Quad Band GSM 5+ Megapixel Camera Cell Phone," Nov. 21, 2008, 3 pages, Popular Electronics, http://www.popularelect.com/product_info.php?products_id=875&osCsid=d9b4eb6c7150c354f9fc573c748b2c06.

Xiaoming Zhao, et al., "Integration of Information Technology, Wireless Networks, and Personal Digital Assistants for Triage and Casualty," Telemedicine and e-Health, Aug. 1, 2006, 2 pages, vol. 12, No. 4, Mary Ann Liebert, Inc., New Rochelle, New York, http://www.liebertonline.com/doi/abs/10.1089/tmj.2006.12.466?cookieSet=1&journalCode=tmj.

* cited by examiner

SECURE RECONFIGURATION OF WIRELESS COMMUNICATION DEVICES

TECHNICAL FIELD

Aspects of the disclosure are related to the field of communications, and in particular, reconfiguring wireless communication devices in wireless communication networks.

TECHNICAL BACKGROUND

Wireless communication systems typically include wireless access nodes, such as base stations, which provide wireless access to communication services for user devices over wireless links. A typical wireless communication system includes many wireless access nodes to provide wireless access across a geographic region, with individual wireless coverage areas associated with each wireless access node. The wireless access nodes exchange user communications and overhead communications between wireless user devices and a core network of the wireless communication system over backhaul communication links.

To access the communication services of the wireless communication system, the user devices, such as wireless communication devices, are typically activated upon purchase, such as with a particular wireless company or carrier retail store. The activation allows the physical user device to be associated with the wireless carrier and obtain authorization to engage in user communications over the wireless communication system of the particular wireless carrier. Many times, the user devices are locked to one particular carrier.

Overview

What is disclosed is a method of operating a communication system to reconfigure a wireless communication device. The method includes, in the wireless communication device, optically receiving image data. The method also includes processing the image data to display a configuration interface, and receiving an instruction into the configuration interface to reconfigure the wireless communication device.

What is also disclosed is a communication system. The communication system includes an authorization system configured to receive a reconfiguration request for a wireless communication device. The wireless communication device is configured to optically receive image data associated with a response to the reconfiguration request, process the image data to display a configuration interface, and receive an instruction into the configuration interface to reconfigure the wireless communication device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
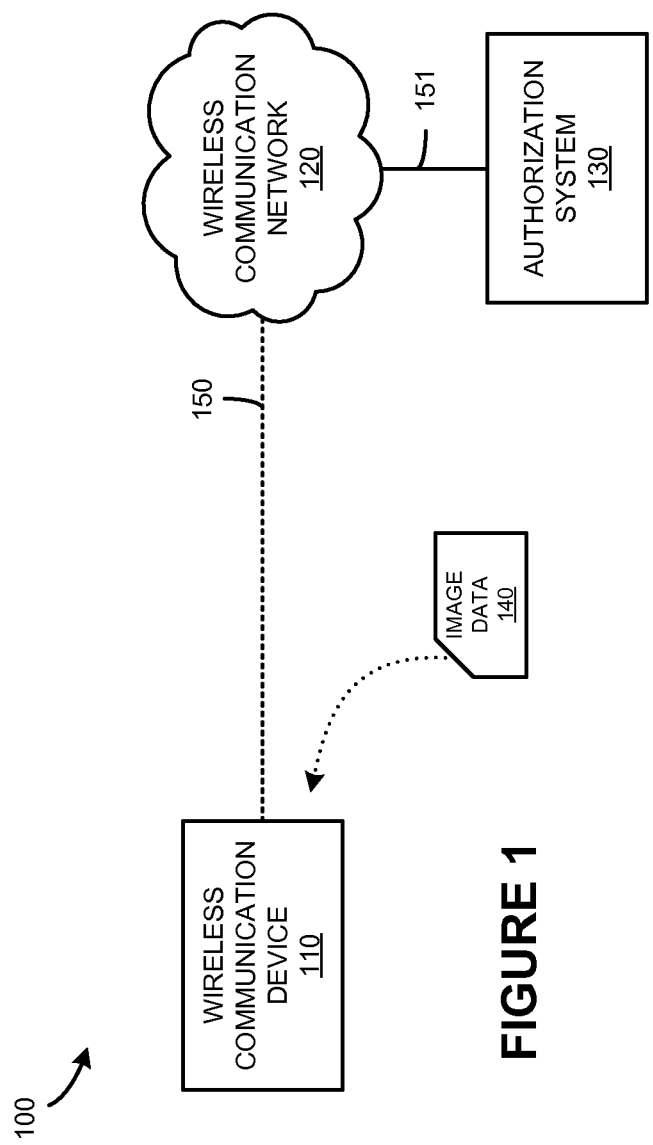
FIG. 1 is a system diagram illustrating a communication system.

FIG. 1 is a system diagram illustrating communication system 100. Communication system 100 includes wireless communication device 110, wireless communication network 120, and authorization system 130. Wireless communication device 110 and wireless communication network 120 communicate over wireless link 150. Authorization system 130 and wireless communication network 120 communicate over link 151.

In FIG. 1, wireless communication device 110 can communicate with wireless communication network 120 over wireless link 150 to receive wireless access to communication services, such as voice calls, data transfer, email, text messaging, or other communication services. Before wireless communication device 110 can receive wireless access to the communication services, wireless communication device 110 must be reconfigured in this example. In other examples, wireless communication device 110 already receives wireless access to the communication services of wireless communication network 120 or another wireless communication network, but a user of wireless communication device 110 desires to reconfigure wireless communication device 110 to operate using a different device identity, user identity, network identity, or other identity information.

Figure 2:
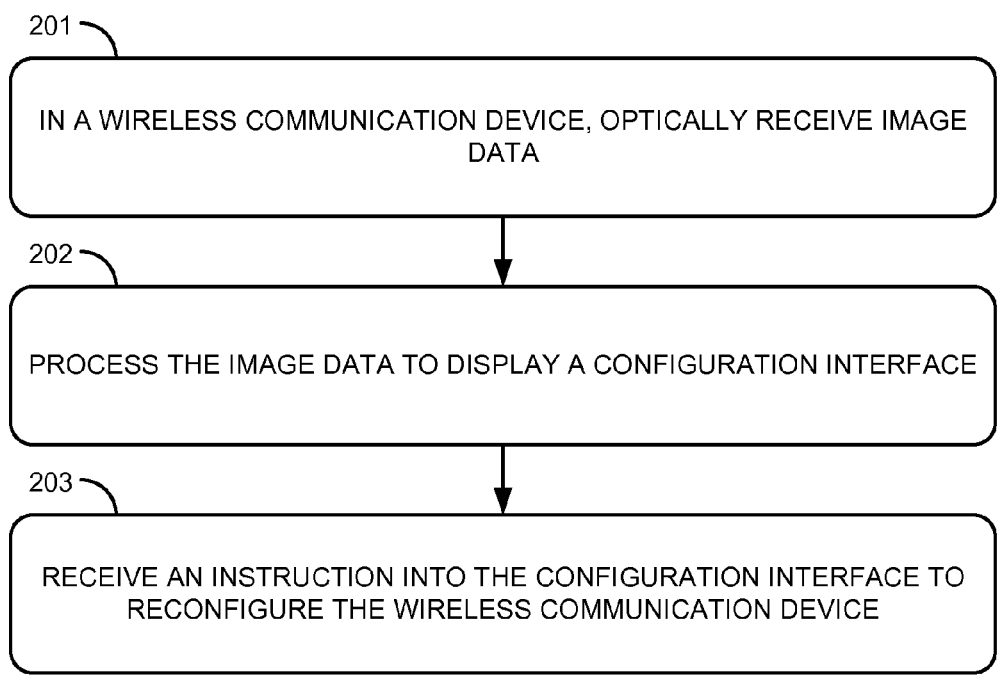
FIG. 2 is a flow diagram illustrating a method of operation of a communication system.

FIG. 2 is a flow diagram illustrating a method of operating communication system 110. The operations of FIG. 2 are referenced herein parenthetically. In FIG. 2, wireless communication device 110 optically receives (201) image data 140. In some examples, equipment in wireless communication network 120 or authorization system 130 generates the image data for transfer to wireless communication device 110. Image data 140 could include a digital graphic displayed on a display system, such as computer monitor, television, web browser, or specialized computer application, among other display systems. In other examples, a hard copy of image data 140 is received, such as a paper printout, flyer, brochure, or other physical representation. Wireless communication device 110 could include circuitry or equipment to optically receive image data 140, such as an optical sensor, digitizer, digital camera, video capture device, barcode scanner, laser, or photodiode, among other digital imaging or optical input equipment.

Wireless communication device 110 processes (202) the image data to display a configuration interface. Image data 140 includes information, such as authorization information, to authorize access to the configuration interface. This authorization information could include static information including an identifier associated with wireless communication device 110, such as a manufacture-assigned identify for wireless communication device 110, and could include additional information, such as dynamic information including timestamps, authorization codes, or other information associated with the present transaction to display the configuration interface. In some examples, image data 140 includes encoded, encrypted, or obfuscated data incorporated into a digital graphic, such as a barcode, and wireless communication device 110 extracts the data incorporated into the digital graphic and decrypts the data. In other examples, wireless communication device 110 processes a first portion of the authorization information included in image data 140, and equipment in wireless communication device 110 or authorization system 130 processes a second portion of the authorization information included in image data 140.

Wireless communication device 110 receives (203) an instruction into the configuration interface to reconfigure wireless communication device 110. The configuration interface could include a user interface provided on wireless communication device 110, such as an application, application interface, web page, applet, supervisory console interface, command shell, or other user interfaces. User input could be received over a keyboard, touchscreen, web interface, button interface, voice input, or other human interface device. The instruction could comprise an instruction to reconfigure wireless communication device 110 to operate using a different device identity, user identity, network identity, or other identity information. The instruction could include an instruction to change a mobile identification number (MIN), mobile device number (MDN), or associated phone number of wireless communication device 110. In other examples, the instruction is an unlock instruction to unlock wireless communication device 110 for use on other wireless carrier networks, such as for changing the home service provider from a first wireless communication network to wireless communication network 120. In examples where the configuration interface comprises a user interface, the configuration interface could be enabled or loaded in response to image data 140 being successfully processed, or could be enabled or loaded to enable optical capture of image data 140, among other combinations thereof. The authorization process could include multiple portions, such as a first authorization portion processed by wireless communication device 110, and a second authorization portion processed by authorization system 130.

Figure 3:
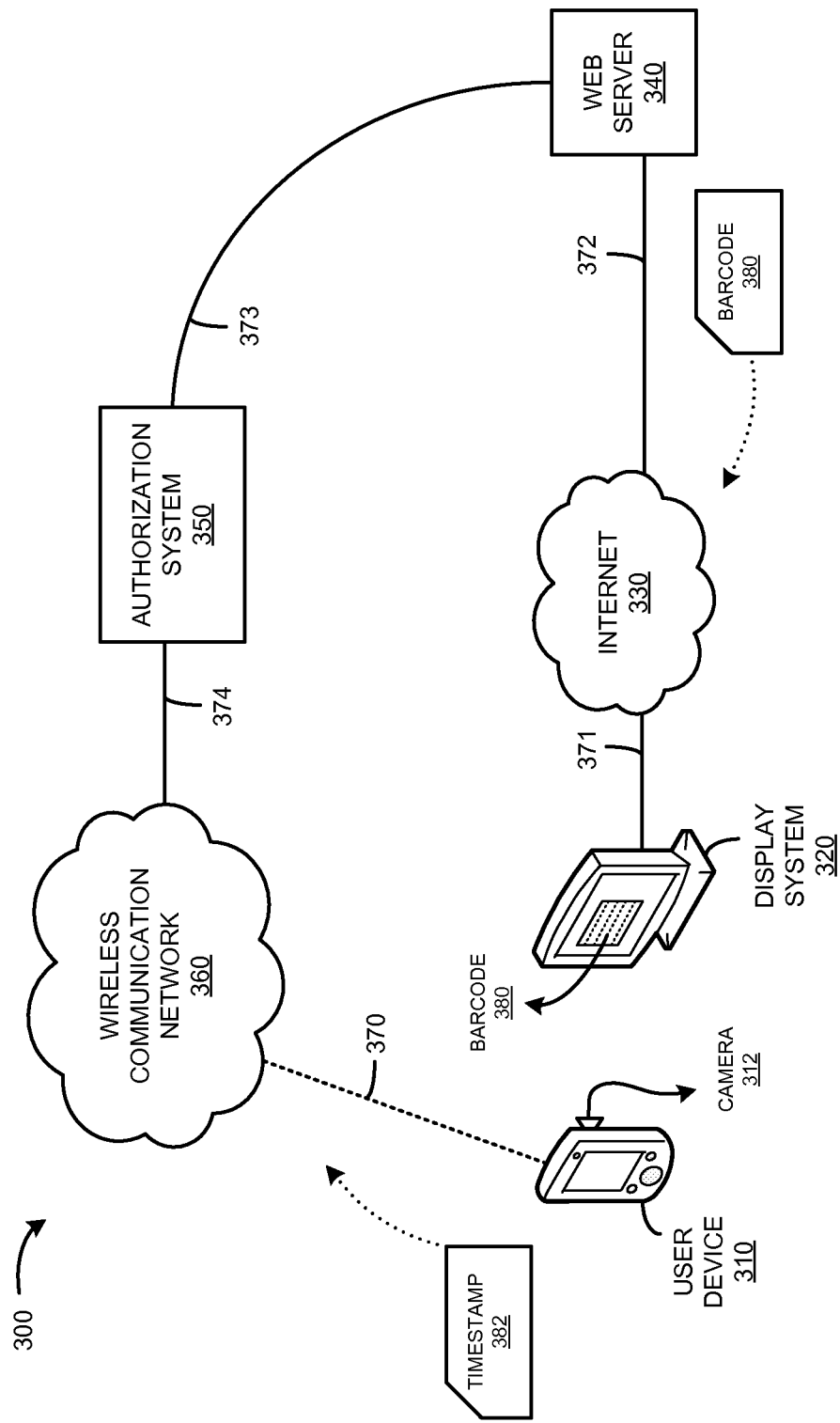
FIG. 3 is a system diagram illustrating a communication system.

FIG. 3 is a system diagram illustrating communication system 300. Communication system 300 includes user device 310, display system 320, Internet 330, web server 340, authorization system 350, and wireless communication network 360. User device 310 and wireless communication network 360 communicate over wireless link 370, which is a Code-Division Multiple Access (CDMA) wireless link in this example. Display system 320 and Internet 330 communicate over link 371, which is a hybrid fiber-coaxial (HFC) link capable of carrying Internet protocol (IP) traffic in this example. Internet 330 and web server 340 communicate over link 372, which is a T1 link capable of carrying IP traffic in this example. Authorization system 350 and web server 340 communicate over link 373, which is an Ethernet link in this example. Authorization system 350 and wireless communication network 360 communicate over link 374, which is an Ethernet link in this example. Although authorization system 350 and web server 340 are shown as separate systems in this example, in other examples authorization system 350 or web server 340 could be included in the same systems, or included in wireless communication network 360.

User device 310 is a wireless communication device, comprising a wireless mobile phone in this example, and is capable of communicating using at least one wireless communication mode, such as the CDMA communication mode. User device 310 includes digital camera 312, which includes an imaging sensor and digital image processing circuitry. In many examples, user device 310 also includes audio input/output equipment, such as a microphone and speaker.

Display system 320 comprises a computer system, which includes a processing system, display, and a computer readable storage medium. The display device can display graphical data to a user, such as barcode 380, or images, videos, applications, web page content, program data, or other graphical data. Display system 320 could include a monitor, disk drives, flash memory, user interface equipment, or other computer systems and equipment. In some examples, display system 320 comprises a laptop, personal computer, game console, e-book, mobile Internet appliance, pad computer, or server, among other computing devices.

Internet 330 includes equipment and systems to route packet communications between endpoints using the Internet protocol (IP). Internet 330 could comprise routers, switches, gateways, or bridges, as well as various interconnecting network links.

Web server 340 comprises a computer server or server systems capable of hosting web pages. Web server 340 includes computer systems and computer readable storage media to provide web page content for delivery over Internet 330. Web server 340 receives digital graphic data, such as barcode 380, for inclusion in a web page. In some examples, web server 340 receives only barcode 380 and generates a web page to include barcode 380, while in other examples, web server 340 receives a web page or collection of web pages generated by authorization system 350 for subsequent hosting. The web page content could be encapsulated into packets appropriate for transfer over Internet 330, such as IP packets. Example web page content could include video streams, audio streams, images, text, formatting information, hyperlinks, or other content. In other examples, web server 340 comprises an email server capable of transferring barcode 380 in an email format.

Authorization system 350 includes computer processing equipment for generating authorization information in a digital graphic format, such as barcode 380, for authorization or unlocking of user devices. Authorization system 350 also includes computer processing equipment for processing image data, or extracted data from image data, to decrypt, authenticate, or authorize information to authorize user devices for various wireless access features of wireless communication network 360. Authorization system 350 includes equipment such as processing systems, communication interfaces, computer-readable storage media, and other equipment to store and exchange authorization information, such as in a digital graphic format, for user devices. Authorization system 350 may comprise operating systems, logs, utilities, drivers, networking software, firmware, and other software typically loaded onto a computer system. In some examples, authorization system 350 further comprises authentication, authorization and accounting (AAA) equipment, including equipment to determine accounting information for user devices, such as billing, metering, time-based usage, or other user device account monitoring information.

Wireless communication network 360 is a wireless network of a wireless communication provider, such as a cellular service provider. Wireless communication network 360 includes equipment and systems to provide wireless access to communication services for user devices within different coverage areas. Wireless communication network 360 could comprise base stations, wireless access nodes, base station controllers (BSC), mobile switching centers (MSC), radio node controllers (RNC), packet data switching nodes (PDSN), home agents (HA), mobility access gateways (MAG), Internet access nodes, call processing systems, telephony service nodes, wireless data access points, routers, databases, or other communication and control equipment.

Figure 4:
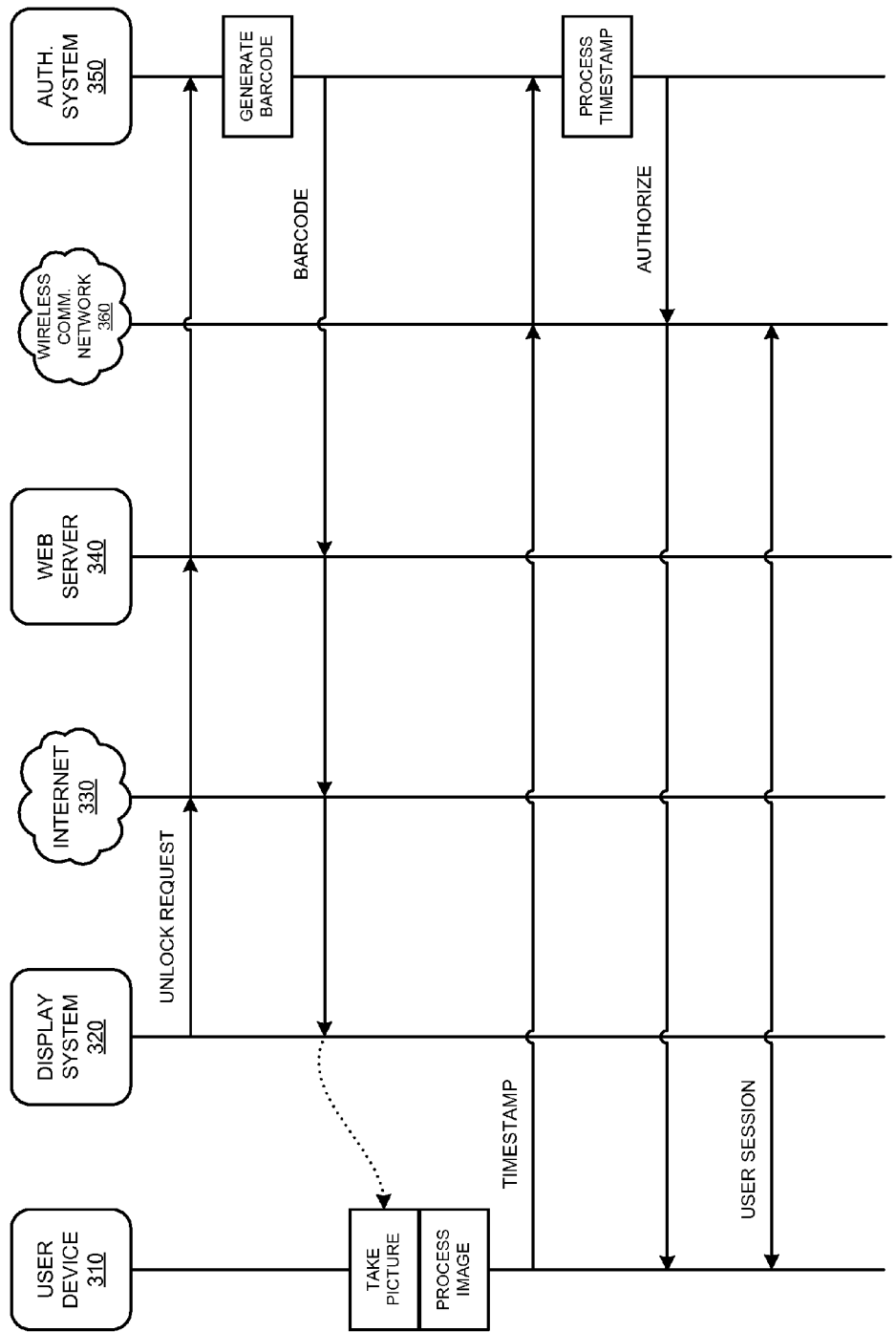
FIG. 4 is a sequence diagram illustrating a method of operation of a communication system.

FIG. 4 is a sequence diagram illustrating a method of operating communication system 300. In FIG. 4, display system 320 transfers an unlock request for user device 310 for delivery to authorization system 350. The unlock request is transferred by display system 320 to modify an identity of user device 310, to modify state of a master subsidy lock of user device 310, or to change other configurations of user device 310. In this example, the unlock request is transferred over link 371, Internet 330, link 372, and received by web server 340. Web server 340 could present a web page or online interface for users of wireless communication devices, such as user device 310, to unlock wireless communication devices. The web page or other online interface could be accessible over Internet 330, at any workstation, computer, or Internet-capable device, such as display system 320. In further examples, a voice call, text message, or email, is transferred by display system 320 or user device 310 to transfer the unlock request. The unlock request could include information about user device 310, such as a mobile device number (MDN), mobile station identifier (MSID), mobile equipment identifier (MEID), mobile identification number (MIN), electronic serial number (ESN), device type, model number, serial number, SIM card identifier, phone number, account number, or other information. Web server 340 transfers the unlock request for delivery to authorization system 350 over link 373. Although the unlock request originates at display system 320 in this example, in further examples the unlock request could originate from user device 310. In examples where the unlock request originates from user device 310, user device 310 could be interfaced to display system 320, such as through a peripheral port or network link associated with display system 320.

In response to the unlock request, authorization system 350 generates a digital graphic, namely barcode 380. Barcode 380 includes authorization information associated with the unlock request. In this example, the authorization information includes static information and dynamic information. The static information includes information which is associated with user device 310 or a user of user device 310, and could comprise predetermined identifiers associated with user device 310, such as a master subsidy lock command or identifier, or a MDN, MSID, MSED, MIN, ESN, device type, model number, serial number, SIM card identifier, phone number, account number, or other information. The dynamic information could include information generated by authorization system 350 in response to the unlock request, which could comprise timestamps, encryption keys, temporary identifiers, semaphores, or other information. Typically, the static information is previously stored on user device 310 or known by a user of device 310, while the dynamic information is not initially stored on user device 310 or not initially known by a user of user device 310. Other configurations could be employed.

In this example, barcode 380 comprises the MSID associated with user device 310, which is stored in user device 310 at the time of manufacture, a master subsidy lock (MSL) identifier, which allows a user to unlock user device 310, and a timestamp associated with the present unlock request. Other information could be included, as discussed herein. The information included in barcode 380 could be represented in a numerical format and then encoded into the graphical format employed for barcode 380, such as a matrix code or two-dimensional barcode representation. Other graphical encoding schemes could be employed, such as a captcha format, image watermarking, compression, or other image or video-based encoding schemes. Authorization system 350 also encrypts the information prior to encoding into the barcode representation. The encryption scheme employed could include asymmetric key, symmetric key, obfuscation, hashing, or other encryption schemes. In some examples, the static information is encrypted in a different encryption format or using a different encryption key than the dynamic information. In further examples, the static information is not encrypted, while the dynamic information is encrypted. In yet further examples, the MSID, MSL, and timestamp are all individually encrypted.

Once authorization system 350 generates barcode 380, authorization system 350 transfers barcode 380 for delivery to display system 320. In this example, authorization system 350 transfers barcode 380 for delivery to web server 340 for inclusion in a web page generated by web server 340 or authorization system 350. The web page could include an embedded image comprising barcode 380 or include a hyperlink to a file for download which includes barcode 380. Other image transfer techniques could be employed. Barcode 380 is then provided to display system 320 for display to a user of user device 310. Barcode 380 could be displayed on a monitor of display system 320, such as in a web browser or other graphical application user interface. In further examples, display system 320 includes a printer for physically printing barcode 380 onto a physical medium, such as paper.

User device 310 then optically captures barcode 380, such as by taking a picture of barcode 380 while barcode 380 is displayed in a web browser or image viewing application of display system 320. The optically captured barcode 380 is stored in user device 310 on a computer-readable medium as image data. User device 310 includes camera 312 in this example, which is used to capture barcode 380 from a display or monitor associated with display system 320, or alternatively from a paper printout of barcode 380. In further examples, user device could optically capture barcode 380 via a laser, photodiode, scanner, or other optical capture apparatus.

User device 310 then processes the image data of the optically captured barcode 380 to determine information included therein. In this example, barcode 380 includes authorization information encoded into a barcode graphical representation. User device 310 processes the image data to determine the authorization information encoded in the barcode graphical representation. First, the image data is processed to extract the barcode representation from the image data. The image data may include non-barcode information, such as other display data or items in the scene unintentionally captured by camera 312. This barcode extraction could include cropping, rotating, resizing, retouching, or other image manipulation or modification of the image data.

Once barcode 380 has been extracted from the image data, barcode 380 is processed to extract the authorization information from barcode 380. Barcode 380 could be processed in many different exemplary ways to extract the information contained therein. In this example, both static information and dynamic information are included in barcode 380, and the information is encrypted. In some examples, the static information is extracted, while the dynamic information is not extracted from barcode 380. In other examples, both the static information and the dynamic information are extracted from barcode 380, but only the static information is decrypted or otherwise interpreted by user device 310. In further examples, both the static information and the dynamic information are extracted from barcode 380, and both are decrypted.

As discussed above for this example, the static information encoded into barcode 380 by authorization system 350 includes an authorization identifier, such as a MSID associated with user device 310, and the dynamic information includes a dynamic identifier, such as a timestamp associated with the unlock request. The information encoded into barcode 380 also includes a MSL identifier, which could be included in either the static or dynamic information portion.

In this example, the MSID and MSL are included in the static information portion, and both are extracted from barcode 380. However, in this example, the static information is encrypted using a different encryption method or encryption key than the dynamic information, and user device 310 is configured to decrypt the static information, but not decrypt the dynamic information. A selected portion of the static information, once extracted and decrypted, is compared to information stored on user device 310, such as a MSID associated with user device 310 assigned during manufacture. If the comparison succeeds, such as when information received in barcode 380 corresponds to information previously stored in user device 310, then user device 310 transfers the dynamic information. If the comparison fails, the unlock process could halt or terminate, or an error message could be conveyed to a user of user device 310.

Assuming the comparison of the selected static information succeeds, the dynamic information, such as the timestamp, is transferred for delivery to authorization system 350. In this example, the timestamp is transferred as encrypted data extracted from barcode 380, where user device 310 did not decrypt the dynamic information prior to transfer. In other examples, the image data including barcode 380, or a portion thereof, is transferred for delivery to authorization system 350 for extraction and decryption of the dynamic information. As shown in FIG. 4, the dynamic information, namely the timestamp portion, is transferred through wireless communication network 360 for delivery to authorization system 350. User device 310 could transfer the dynamic information by including the dynamic information in a provisioning or activation request for wireless access from wireless communication network 360. Wireless communication network 360 could then pass the dynamic information to authorization system 350 when processing the provisioning or activation request. In other examples, user device 310 transfers the dynamic information for delivery to authorization system 350 separately from a provisioning or activation request. In further examples, the dynamic information is transferred over Internet 330, such as when user device 310 and display system 320 are linked over a wireless or wireline link.

Once authorization system 350 receives the dynamic information, the dynamic information is processed to determine if the dynamic information is valid for the present unlock request or activation request. In this example, the dynamic information includes a timestamp portion associated with the unlock request, and the timestamp is compared to a present time by authorization system 350. This timestamp, embedded and encrypted in barcode 380, allows barcode 380 to have a validity lifetime. If the timestamp corresponds to a time which exceeds a timing threshold from the present time, then barcode 380 is determined to be too old or invalid. If the timestamp falls within the timing threshold from the present time, then barcode 380 is determined to be valid. If the timestamp is not valid or too old, then the unlock process could halt or terminate, or an error message could be conveyed to a user of user device 310.

Assuming a valid timestamp and barcode 380, authorization system 350 transfers an authorization message to wireless communication network 360. Wireless communication network 360 then allows the unlock process, which could include the provisioning or activation request, for user device 310 on wireless communication network 360 to proceed. Wireless communication network 360 transfers an authorization success message to user device 310. In response to the authorization success message, user device 310 could be unlocked for use on the wireless carrier associated with wireless communication network 360. The unlock process could include user device 310 using the MSL identifier, received optically, to unlock user device 310. User device 310 and wireless communication network 360 then engage in a user communication session, and exchange user data, such as voice calls, text messages, email, data transfer, or other user communication sessions. Billing and accounting processes could also be associated with user device 310 by authorization system 350 in response to a successful unlock request.

In some examples, a configuration interface is presented by user device 310 to a user of user device 310. The configuration interface could include a graphical user interface, such as an application, web page, applet, or other user interface. The user interface allows a user of user device 310 to unlock user device 310 or reconfigure user device 310. The configuration interface could be presented to a user at a particular time during the unlock process described above. For example, the user could initially be presented with a configuration interface on user device 310 for optical capture of barcode 380, such as through a camera interface. The configuration interface could then process the image data as discussed herein and transfer selected information from the image processing for delivery to authorization system 350. In other examples, the configuration interface, or a selected portion of the configuration interface, is presented only after the portions of the static information have been verified by user device 310. The configuration interface could then allow a user of user device 310 to reconfigure user device 310, such as change a master subsidy lock setting of user device 310, removing a master subsidy lock, modifying a phone number, mobile device number, mobile identification number, or other changes. In other examples, the user is presented with the configuration interface on user device 310 after both the static information and dynamic information has been verified, such as after receipt of an authorization success message or once user device 310 is authorized or provisioned on wireless communication network 360. In further examples, a first portion of a configuration interface is presented to enable user device 310 to optically capture barcode 380, a second portion of the configuration interface is presented after determination and validation of static information, and a third portion of the configuration interface is presented after validation of dynamic information.

Reconfiguring user device 310 could enable a user of user device 310 to use multiple user devices for a single user device account, such as for a single phone number or service agreement. For example, a user may have two user devices, one of which includes user device 310, and the user may desire to switch from using a first user device to using user device 310 on a single associated phone number. The configuration interface could allow the user of user device 310 to change an internal parameter of user device 310 to activate user device 310 to receive wireless access to communication services on the associated phone number. A configuration interface could also allow the user of the first user device to deactivate the first user device, and separate configuration interfaces could be presented on the first user device and user device 310. To activate user device 310 for use on wireless communication network 360, an identity of user device 310, such as an associated phone number, mobile device number (MDN), or mobile identification number (MIN) may need to be changed. Changing the identity of user device 310 may require overriding a state of a master subsidy lock (MSL) on user device 310. The unlock process described herein allows the MSL state to be changed, thus unlocking user device 310 for subsequent changes to the aforementioned parameters or identities of user device 310.

Reconfiguring user device 310 could also enable user device 310 to be used on different wireless communication networks or to be associated with different wireless carriers. In some examples, user device 310 could be compatible with many different wireless communication networks associated with different wireless carriers or wireless companies. However, the initial wireless carrier that a user of user device 310 selects may configure user device 310 to be locked to that initial carrier. Subsequent use on a network of another carrier, or subsequent switching to become a customer of another carrier, is prevented by the locking of user device 310 to the initial carrier. In some examples, the locking is a master subsidy lock (MSL) process. For example, a cell phone may initially be purchased through a Sprint retail store for use on a Sprint network, and the cell phone is locked to Sprint as a wireless service provider. At a later time, the user desires to switch wireless service providers to another carrier, but the cell phone would be locked and prevent the user from associating the phone with the other carrier. The methods described herein would allow for a secure unlocking a cell phone for use on another carrier without disclosing a master subsidy lock identifier to a user of user device 310.

Although a graphical representation, such as a barcode, has been discussed herein to transfer authorization information, it should be understood that other representations could be employed. These other representations could include video representations, audio representations, vibration representations, or other representations which user device 310 could receive and digitize to subsequently extract authorization included therein.

Figure 5:
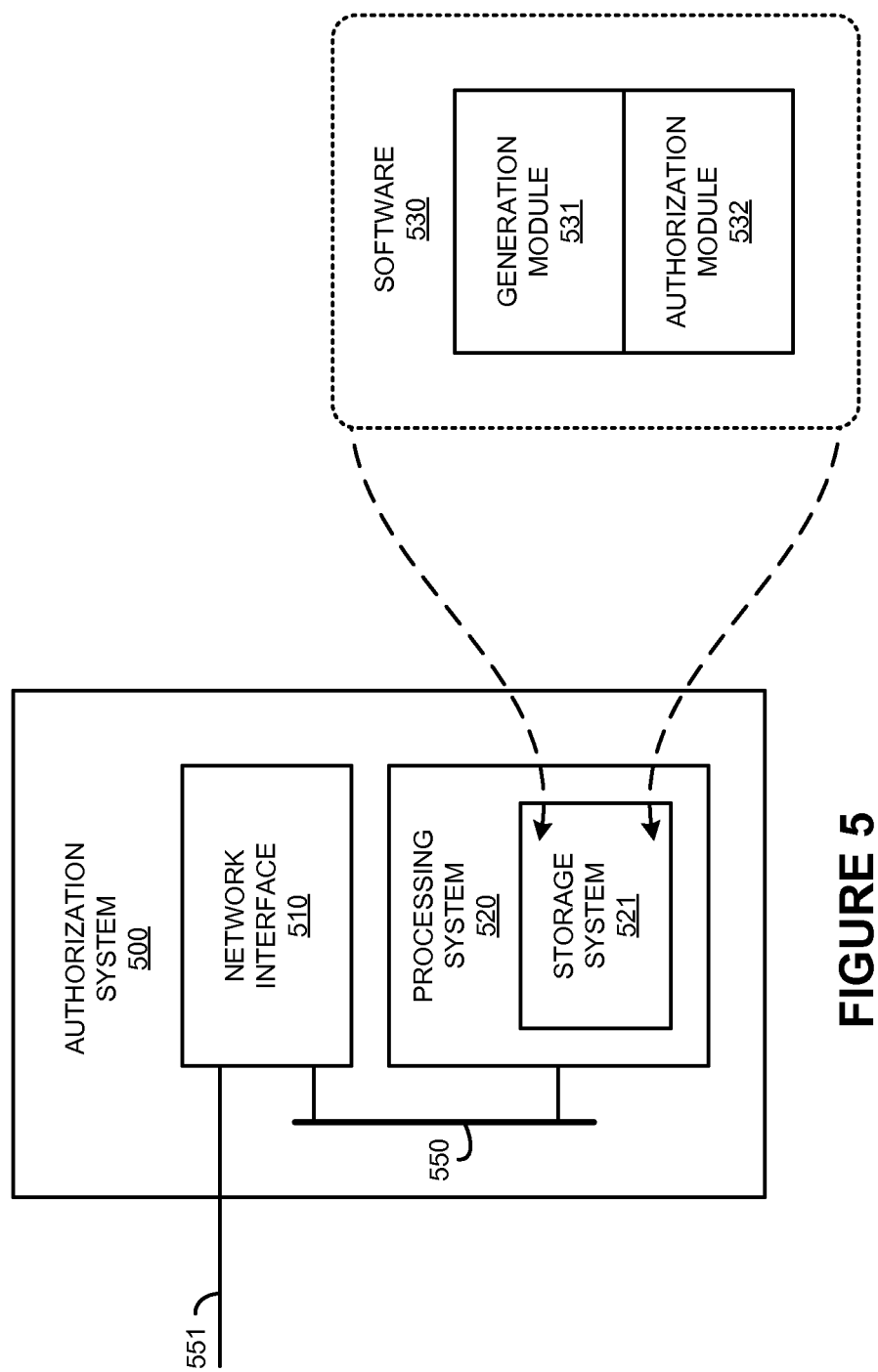
FIG. 5 is a block diagram illustrating an authorization system.

FIG. 5 is a block diagram illustrating authorization system 500, as an example of authorization system 130 found in FIG. 1 or authorization system 350 found in FIG. 3, although authorization system 130 or authorization system 350 could use other configurations. Authorization system 500 includes network interface 510 and processing system 520. Network interface 510 and processing system 520 communicate over a common bus 550 for illustrative purposes. It should be understood that discrete links could be employed, such as network links. Authorization system 500 may be distributed among multiple devices that together form elements 510, 520-521, 530-532, and 550-551.

Network interface 510 comprises network router and gateway equipment for communicating over a packet network or between elements of a communication provider, such as with Internet systems, wireless access systems, or other communication systems. Network interface 510 exchanges authorization information over link 551. Link 551 could use various protocols or communication formats as described herein for links 151 or 371-374, including combinations, variations, or improvements thereof.

Processing system 520 includes storage system 521. Processing system 520 retrieves and executes software 530 from storage system 521. In some examples, processing system 520 is located within the same equipment in which network interface 510 or domain name database 540 are located. In further examples, processing system 520 comprises specialized circuitry, and software 530 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices.

Software 530 may include an operating system, logs, utilities, drivers, networking software, databases, and other software typically loaded onto a computer system. Software 530 could contain application programs, databases, server software, firmware, or some other form of computer-readable processing instructions. When executed by processing system 520, software 530 directs processing system 520 to operate as described herein, such as receive authorization or unlock requests for wireless communication devices, generate graphical representations of authorization information, or authorize wireless communication devices, among other operations.

In this example, software 530 includes generation module 531 and authorization module 532. It should be understood that a different configuration could be employed, and individual modules of software 530 could be included in different equipment than wireless access system 500. Generation module 531 is configured to generate digital graphical representations of information. The information could include authorization information, identity data, device identifiers, timestamps, static data, dynamic data, or other information. The digital graphical representations could include barcodes, images, video, scrambled text, or other graphical representations in a digital image format. In some examples, generation module 531 encrypts, encodes, or compresses the information before encoding the information in the graphical representation. Generation module 531 could transfer the graphical representations as digital data or image data through network interface 510. In further examples, generation module 531 generates a web page for displaying the graphical representations, while in other examples, generation module 531 transfers the graphical representations for delivery to a web server over link 551. Authorization module 532 determines if data transferred by a wireless communication device is authentic and authorizes wireless communication devices. In some examples, authorization module 532 receives data derived from image data, such as image data portions of the graphical representations, and determines authorization status based on the data. The data could include a timestamp, for example, transferred by a wireless communication device after the wireless communication device processes image data to extract the timestamp. Other examples of data used to authorize or authenticate a wireless communication device could be employed as discussed herein. In some examples, authorization module 532 decrypts data received from wireless communication device.

Bus 550 comprises a physical, logical, or virtual communication link, capable of communicating data, control signals, and communications, along with other information. In some examples, bus 550 is encapsulated within the elements of network interface 510 or processing system 520, and may be a software or logical link. In other examples, bus 550 uses various communication media, such as air, space, metal, optical fiber, or some other signal propagation path, including combinations thereof. Bus 550 could be a direct link or might include various equipment, intermediate components, systems, and networks. Bus 550 could be a common link, shared link, or may be comprised of discrete, separate links.

Figure 6:
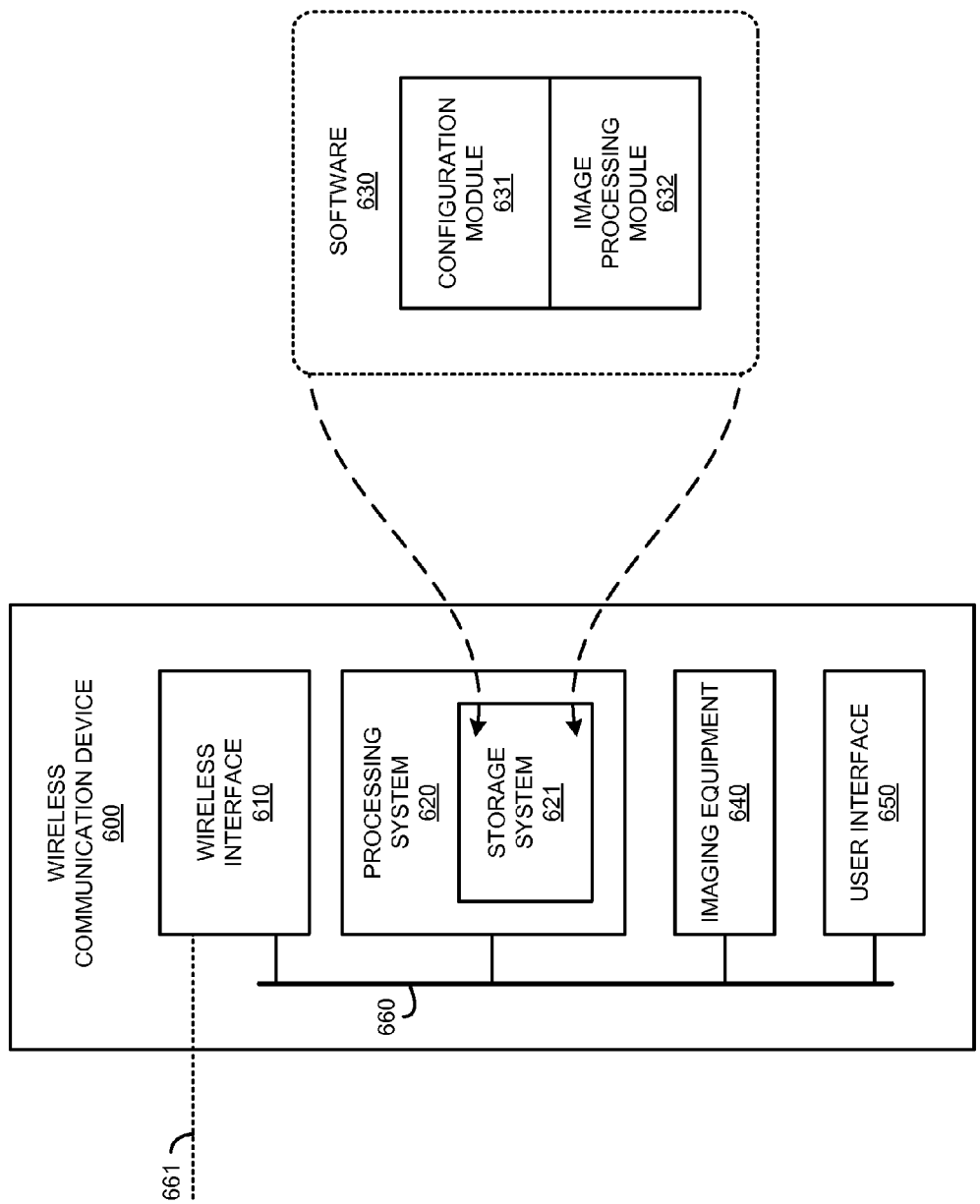
FIG. 6 is a block diagram illustrating a wireless communication device.

FIG. 6 is a block diagram illustrating wireless communication device 600, as an example of wireless communication device 110 found in FIG. 1 or user device 310 found in FIG. 3, although wireless communication device 110 or user device 310 could use other configurations. Wireless communication device 600 includes, wireless interface 610, processing system 620, imaging equipment 640, and user interface 650. Wireless interface 610, processing system 620, imaging equipment 640, and user interface 650 communicate over bus 660. Wireless communication device 600 may be distributed or consolidated among equipment or circuitry that together form elements 610, 620-621, 630-631, 640, 650, and 660-661.

Wireless interface 610 comprises a communication interface for communicating with wireless access nodes of a wireless communication network. Wireless interface 610 could include transceiver equipment and antenna elements for wirelessly exchanging user communications and overhead communications over the associated wireless link 661. Wireless interface 610 also receives command and control information and instructions from processing system 620 or user interface 650 for controlling the operations of wireless communications over wireless link 662. Wireless link 662 could use various protocols or communication formats as described herein for wireless links 150 or 370, including combinations, variations, or improvements thereof.

Processing system 620 includes storage system 621. Processing system 620 retrieves and executes software 630 from storage system 621. In some examples, processing system 620 is located within the same equipment in which user interface 610, imaging equipment 640, or user interface 650 are located. In further examples, processing system 620 comprises specialized circuitry, and software 630 or storage system 621 could be included in the specialized circuitry to operate processing system 620 as described herein. Storage system 621 could include a computer-readable medium such as a disk, tape, integrated circuit, server, or some other memory device, and also may be distributed among multiple memory devices.

Software 630 may include an operating system, logs, utilities, drivers, networking software, and other software typically loaded onto a computer system. Software 630 could contain application programs, server software, firmware, or some other form of computer-readable processing instructions. When executed by processing system 620, software 630 directs processing system 620 to operate as described herein, such as optically receive image data, process image data to display a configuration interface or to determine authorization information, present a configuration interface, and receive instructions into the configuration interface to reconfigure wireless communication device 600, among other operations.

In this example, software 630 includes configuration module 631 and image processing module 632. It should be understood that a different configuration could be employed, and individual modules of software 630 could be included in different equipment in wireless communication device 600. Configuration module 631 presents a configuration interface for a user of wireless communication device 600. The configuration interface could include a text or graphical user interface, and could be presented through user interface 650 to a user. Configuration module 631 also receives instructions to reconfigure wireless communication device 600, such as through user input received through user interface 650. Image processing module 632 receives image data captured by imaging equipment 640, processes the image data to determine information embedded in the image data, such as authorization information, identifiers, timestamps, or other information. Image processing module 632 also may decrypt or decode information received in the form of image data. In some examples, image processing module 632 transfers the processed image data, or a portion thereof, over wireless link 661 through wireless interface 610.

Imaging equipment 640 includes circuitry and equipment to receive and process images or video from a digital camera portion thereof. Imaging equipment 640 could comprise amplifiers, analog-to-digital converters, image processors, buffers, image compression processors, image encoding processors, or other imaging circuitry and equipment. Imaging equipment 640 could encode, compress, or encrypt the images or video into a digital format, such as JPEG, TIFF, GIF, BMP, PNG, RAW, MPEG, H.264, a packet format, or other digital image or video format.

User interface 650 includes equipment and circuitry for receiving user input and control, such as for engaging in voice calls, data sessions, or configuring wireless communication device 600, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 650 also includes equipment to communicate information to a user of wireless communication device 600. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Bus 660 comprises a physical, logical, or virtual communication link, capable of communicating data, control signals, and communications, along with other information. In some examples, bus 660 is encapsulated within the elements of wireless interface 610, processing system 620, imaging equipment 640, or user interface 650, and may be a software or logical link. In other examples, bus 660 uses various communication media, such as air, space, metal, optical fiber, or some other signal propagation path, including combinations thereof. Bus 660 could be a direct link or might include various equipment, intermediate components, systems, and networks.

Referring back to FIG. 1, wireless communication device 110 comprises transceiver circuitry and communication elements. The transceiver circuitry typically includes amplifiers, filters, modulators, and signal processing circuitry. Wireless communication device 110 may also include user interface systems, memory devices, computer-readable storage mediums, software, processing circuitry, or some other communication components. Wireless communication device 110 may be a user device, subscriber equipment, customer equipment, access terminal, telephone, mobile wireless telephone, computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be shown.

Wireless communication network 120 comprises communication and control systems for providing wireless access to communication services for wireless communication devices. In some examples, wireless communication network 120 includes equipment to provide wireless access to communication services within different coverage areas to user devices, route communications between content providers and user devices, and receive registration and content requests, among other operations. Wireless communication network 120 may also comprise base stations, base transceiver stations (BTS), base station controllers (BSC), mobile switching centers (MSC), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, wireless data access points, routers, databases, or other communication and control equipment.

Authorization system 130 comprises communication interfaces, computer systems, microprocessors, circuitry, computer-readable media, or other processing devices or software systems, and may be distributed among multiple processing devices. Authorization system 130 could be included in the equipment or systems of wireless communication network 120, or could be included in separate equipment or systems. Examples of authorization system 130 may also each include software such as an operating system, logs, utilities, drivers, networking software, and other software stored on a computer-readable medium. Authorization system 130 could also include an application server, application service provider system, database system, web server, or other systems.

Wireless link 150 uses the air or space as the transport media. Wireless link 150 may use various protocols, such as Code Division Multiple Access (CDMA), Evolution-Data Optimized (EV-DO), single-carrier radio transmission technology link (1xRTT), Worldwide Interoperability for Microwave Access (WiMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), or some other wireless communication format, including combinations, improvements, or variations thereof. Although one wireless link 150 is shown in FIG. 1, it should be understood that wireless link 150 is merely illustrative to show a communication mode or a wireless access pathway for wireless communication device 110. In other examples, further wireless links could be shown, with portions of the further wireless links shared and used for different communication sessions and associated paging or overhead communications.

Communication link 151 uses metal, glass, optical, air, space, or some other material as the transport media. Communication link 151 could use various communication protocols, such as Time Division Multiplex (TDM), asynchronous transfer mode (ATM), Internet Protocol (IP), Ethernet, synchronous optical networking (SONET), circuit-switched, communication signaling, wireless communications, or some other communication format, including combinations, improvements, or variations thereof. Communication link 151 could be a direct link or may include intermediate networks, systems, or devices, and could include a logical network link transported over multiple physical links.

Links 150-151 may each include many different signals sharing the same associated links, as represented by the associated lines in FIG. 1, comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system to reconfigure a wireless communication device, the method comprising:
   in the wireless communication device, optically receiving image data;
   the wireless communication device processing the image data to identify at least a device identifier and a timestamp encoded in the image data, processing the device identifier against an identifier of the wireless communication device, and transferring the timestamp for delivery to an authorization system;
   the authorization system processing the timestamp against a present time to authorize display of a configuration interface by the wireless communication device; and
   receiving an instruction into the configuration interface on the wireless communication device to reconfigure the wireless communication device.

2. The method of claim 1, further comprising:
   processing a reconfiguration request for the wireless communication device to determine a digital graphic comprising authorization information for the wireless communication device; and
   transferring the digital graphic for delivery to a display system configured to optically display the digital graphic to the wireless communication device for optical capture as the image data by the wireless communication device.

3. The method of claim 2, wherein transferring the digital graphic for delivery to the display system comprises generating a web page comprising the digital graphic for receipt by the display system.

4. The method of claim 2, wherein processing the reconfiguration request for the wireless communication device to determine the digital graphic comprising authorization information for the wireless communication device comprises encrypting the authorization information and generating a barcode representation of the encrypted authorization information.

5. The method of claim 4, wherein processing the image data to identify at least the device identifier and the timestamp encoded in the image data comprises determining the barcode representation from the image data and decrypting the authorization information from the barcode representation to determine at least the device identifier and the timestamp.

6. The method of claim 1, wherein the instruction comprises changing the mobile device number (MDN) of the wireless communication device.

7. The method of claim 1, wherein the timestamp is correlated to a time of a reconfiguration request for the wireless communication device.

8. The method of claim 7, further comprising:
   processing the image data to further identify a master subsidy lock (MSL) identifier for the wireless communication device encoded in the image data.

9. The method of claim 1, wherein processing the device identifier against the identifier of the wireless communication device comprises comparing the device identifier with the identifier of the wireless communication device to determine if the device identifier matches the identifier of the wireless communication device, and wherein processing the timestamp against the present time comprises comparing the timestamp against the present time to determine if the timestamp is within a threshold time of the present time.

10. The method of claim 1, further comprising:
processing the image data to determine authorization information, wherein the authorization information comprises a static portion and a dynamic portion; and
further comprising:
comparing the static portion of the authorization information with an identifier stored on the wireless communication device and comparing the dynamic portion of the authorization information with a dynamic identifier.

11. A communication system, comprising:
an authorization system configured to receive a reconfiguration request for a wireless communication device;
the wireless communication device configured to optically receive image data associated with a response to the reconfiguration request, process the image data to identify at least a device identifier and a timestamp encoded in the image data, process the device identifier against an identifier of the wireless communication device, and transfer the timestamp for delivery to the authorization system;
the authorization system configured to process the timestamp against a present time to authorize display of a configuration interface by the wireless communication device; and
the wireless communication device configured to receive an instruction into the configuration interface to reconfigure the wireless communication device.

12. The communication system of claim 11, comprising:
the authorization system configured to process the reconfiguration request for the wireless communication device to determine a digital graphic comprising authorization information for the wireless communication device, and transfer the digital graphic for delivery to a display system configured to optically display the digital graphic to the wireless communication device for optical capture as the image data by the wireless communication device.

13. The communication system of claim 12, wherein the authorization system is configured to generate a web page comprising the digital graphic for receipt by the display system to transfer the digital graphic for delivery to the display system.

14. The communication system of claim 12, wherein the authorization system is configured to encrypt the authorization information and generate a barcode representation of the encrypted authorization information to determine the digital graphic comprising the authorization information.

15. The communication system of claim 14, comprising:
the wireless communication device configured to determine the barcode representation from the image data and decrypt the authorization information from the barcode representation to identify at least the device identifier and the timestamp encoded in the image data.

16. The communication system of claim 11, wherein the instruction comprises changing the mobile device number (MDN) of the wireless communication device.

17. The communication system of claim 11, wherein the timestamp is correlated to a time of a reconfiguration request for the wireless communication device.

18. The communication system of claim 17, comprising:
the wireless communication device configured to further process the image data to identify a master subsidy lock (MSL) identifier for the wireless communication device encoded in the image data.

19. The communication system of claim 11, comprising:
the wireless communication device configured to compare the device identifier with the identifier of the wireless communication device to determine if the device identifier matches the identifier of the wireless communication device; and
the authorization system configured to compare the timestamp with a present time to determine if the timestamp is within a threshold time of the present time.

20. The communication system of claim 11, comprising:
the wireless communication device configured to process the image data to determine authorization information, wherein the authorization information comprises a static portion and a dynamic portion, and compare the static portion of the authorization information with an identifier stored on the wireless communication device; and
the authorization system configured to compare the dynamic portion of the authorization information with a dynamic identifier.

* * * * *